(12) United States Patent
Lai et al.

(10) Patent No.: US 6,519,142 B1
(45) Date of Patent: Feb. 11, 2003

(54) ELECTRONIC DEVICE HAVING REMOVABLE COVER

(75) Inventors: Cheng-Shing Lai, Taipei Hsieng (TW); Jia-Jun Cao, Nanking (CN)

(73) Assignee: Inventec Appliances Corp., Taipei Hsieng (TW)

(*) Notice: Subject to any disclaimer, the term of this patent is extended or adjusted under 35 U.S.C. 154(b) by 0 days.

(21) Appl. No.: 09/984,751

(22) Filed: Oct. 31, 2001

(51) Int. Cl.[7] .................................................. G06F 1/16
(52) U.S. Cl. ....................... 361/683; 361/704; 345/156; 455/90
(58) Field of Search ............................... 361/681–683, 361/687, 704, 707; 360/97.01, 98.01; 364/708.1; 345/156, 168; 455/90

(56) References Cited

U.S. PATENT DOCUMENTS 6,317,085 B1 * 11/2001 Sandhu et al. ............... 343/702
6,373,694 B1 * 4/2002 Chang ........................ 361/685
6,407,914 B1 * 6/2002 Helot .......................... 361/686
6,442,637 B1 * 8/2002 Hawkins et al. ............. 710/300

* cited by examiner

*Primary Examiner*—Darren Schuberg
*Assistant Examiner*—Hung Van Duong
(74) *Attorney, Agent, or Firm*—Bacon & Thomas, PLLC

(57) ABSTRACT

An electronic device having a removable cover comprises a housing, a hinged member and a cover, wherein a shaft of the cover can be passed through the bottom of an elastic hook of the hinged member and be positioned in a first recess of the housing while the hinged member is rotated to an open state, and the elastic hook of the hinged member can be snapped into a slot of the housing for securing the shaft so that the cover is capable of pivoting about the electronic device or removing from the electronic device.

7 Claims, 7 Drawing Sheets

ELECTRONIC DEVICE HAVING REMOVABLE COVER

FIELD OF THE INVENTION

The present invention relates to a cover of an electronic device and more particularly to an electronic device having a removable cover which is closed onto the housing of electronic device while in a carrying state for protecting a display on the housing and preserving the electronic device's appearance, and is permitted to be opened and removed from the housing for revealing the display without interfering the use.

BACKGROUND OF THE INVENTION

Since the invention of personal computer (PC) there are increasing number of things capable of being done by PC. This is because installed software has continuously enhanced capabilities. Also, the dependency of human being on PCs is more significant. Further, the functions of PC are incorporated into many consumer electronic and information products (e.g., personal digital assistant (PDAs), cellular phones, or the like) to tailor the needs of consumers. In other words, such electronic products are multifunctional ones. Moreover, the electronic device has the capability of accessing the Internet for downloading data therefrom or communicating information therebetween.

Typically, a commercially available electronic device such as PDA or cellular phone has a display for showing messages and the like. Also, user may clearly see the shown messages or edit files thereon. It is typical for manufacturer to mount a hinged cover on display for protection. An advantageous benefit of such cover is that display is protected from being damaged while user carrying PDA or cellular phone. Further, the appearance of PDA or cellular phone is still well preserved.

But this configuration is unsatisfactory for the purpose for which the invention is concerned for the following reason: The total size of a PDA or cellular phone is increased when cover is opened as compared to that of a closed PDA or cellular phone. This may adversely affect the popularity of PDA or cellular phone because the current trend is slim and compact as pursued by consumers. Further, in a preferred form of using PDA or cellular phone, user may feel a degree of convenience if cover is removed. In view of this, it is desirable to design a PDA or cellular phone having a removable cover so that user may select to mount cover on display as desired. This has the advantages of facilitating the use of display, protecting display in an unused state, preserving electronic device's appearance, integrating cover and PDA or cellular phone, and tailoring the needs of user.

Thus, there is a need of an electronic device having a removable cover in order to overcome the above drawbacks of prior art, i.e., the total size of an electronic device is increased when a cover is opened, it is inconvenient in a used state, and the display of electronic device may be damaged if the cover is not provided.

SUMMARY OF THE INVENTION

It is therefore an object of the present invention to provide an electronic device having a removable cover for obtaining the advantages of protecting a display of the electronic device in an unused state, preserving the electronic device's appearance, and integrating the cover and the electronic device. When the cover is required to stay in a closed state, simply pull a hinged member to disengage an elastic hook from a slot. Thus, it is easy to remove the cover from the electronic device. Next, snap the hinged member to the original closed position. This does not change the electronic device's appearance.

It is another object of the present invention to provide an electronic device having a removable cover. For the purpose of positioning the cover in one of a plurality of angles with respect to the electronic device in an open state at least one protuberance is provided on a surface of each lug of the cover and at least one positioning member is provided around a hole of each lug. Hence, snapping members of the electronic device are in an interference engagement with the positioning members and the protuberances for permitting the cover to position in a desired angle about the electronic device and for permitting a user to easily position the cover in the angle.

The above and other objects, features and advantages of the present invention will become apparent from the following detailed description taken with the accompanying drawings.

DETAILED DESCRIPTION OF THE PREFERRED EMBODIMENTS

Figure 1:
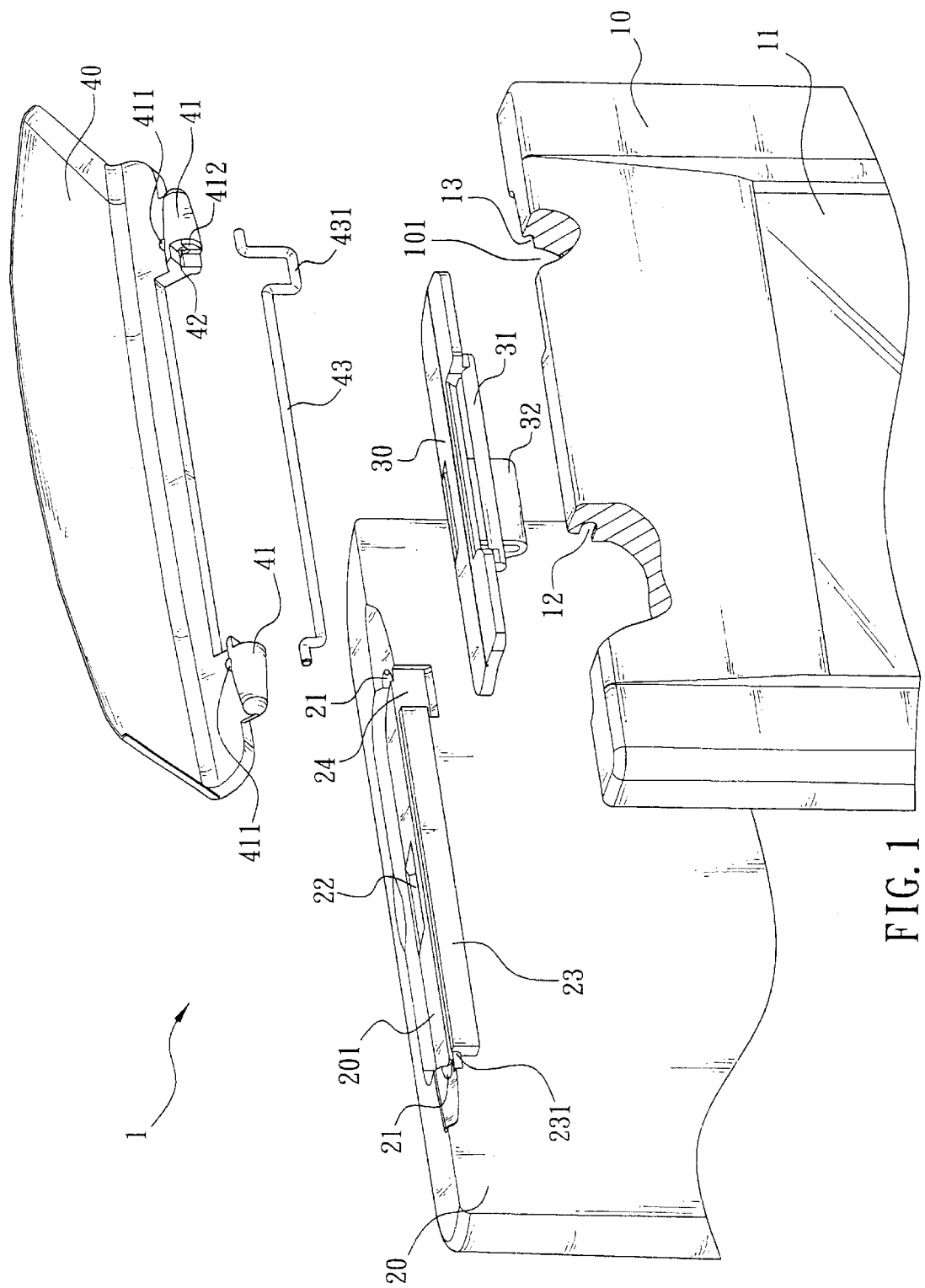
FIG. 1 is a partial exploded view of a first preferred embodiment of electronic device having removable cover according to the invention.
Figure 2:
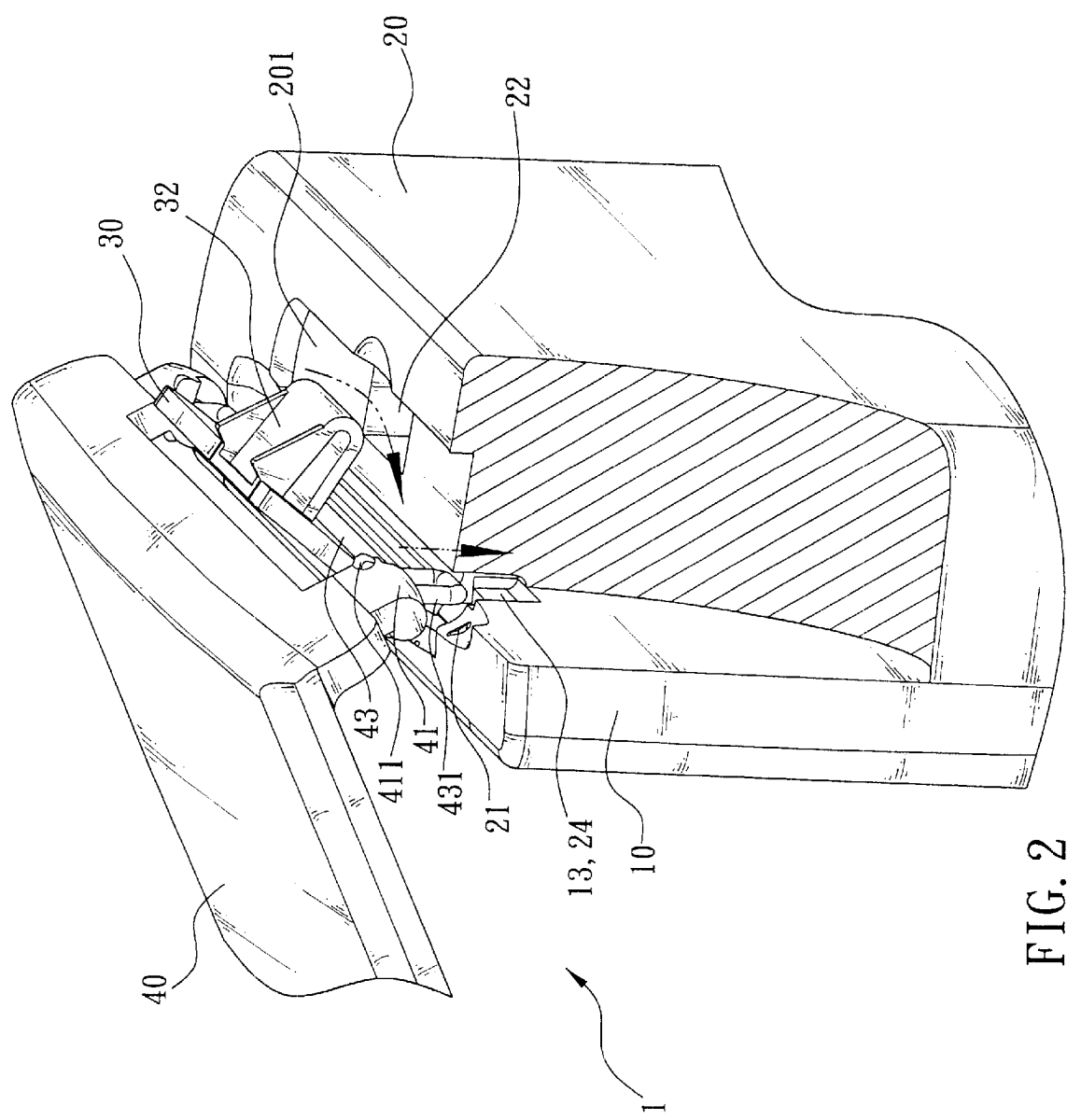
FIG. 2 is a partial cross-sectional view showing shaft of cover inserted into housing of FIG. 1.
Figure 3:
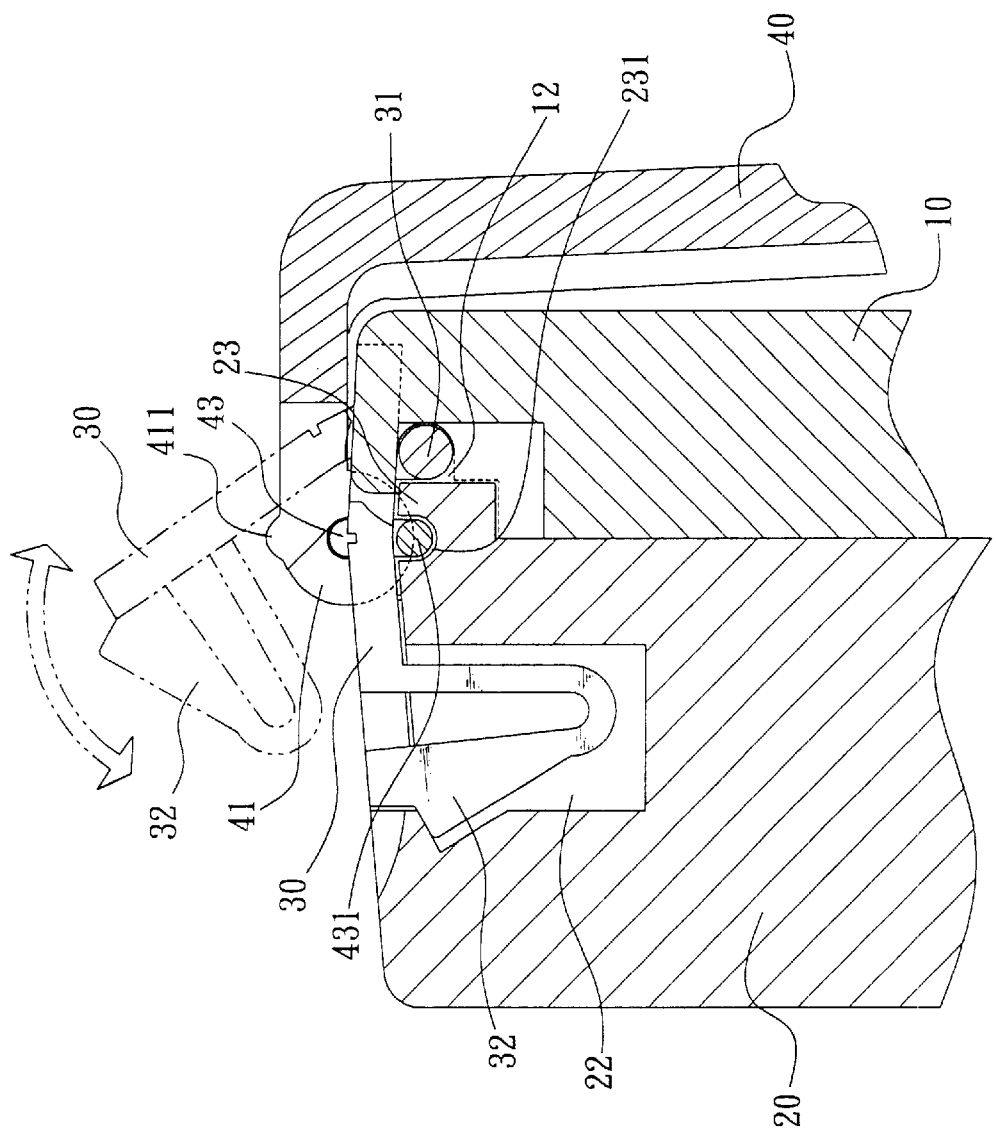
FIG. 3 is a partial cross-sectional view showing assembled upper housing, lower housing, and hinged member of FIG. 1.

Referring to FIGS. 1 to 3, there is shown an electronic device (e.g., PDA or cellular phone) constructed in accordance with the invention comprising an upper housing 10 and a mated lower housing 20. Upper housing 10 comprises a display 11 for user to clearly see the shown messages or edit files thereon, a first recess 101 on an edge, a groove 12 on first recess 101, and a first trough 13 on a side of groove 12.

In the invention, lower housing 20 comprises a second recess 201 corresponding to first recess 101, a snapping member 21 on either end of second recess 201, a slot 22 extended between snapping members 21, a plate member 23 in slot 22 corresponding to groove 12, a parallel slit 231 between plate member 23 and slot 22, and a second trough 24 in one end of plate member 23 corresponding to first trough 13.

In the invention, there is further provided a hinged member 30 comprising a lengthwise pin 31 and an elastic hook 32 associated with pin 31. Pin 31 is disposed in groove 12 of upper housing 10 for coupling upper housing 10 and lower housing 20 together (FIGS. 1 and 3). Also, plate member 23 of lower housing 20 is abutted on pin 31 for preventing pin 31 from moving out of groove 12. Hence, hinged member 30 may pivot about pin 31 as pin 31 is defined in groove 12 by plate member 23. Also, in engaging upper and lower housings 10 and 20, elastic hook 32 is snapped into slot 22 of lower housing 20.

In the invention, there is further provided a rectangular cover 40 on upper housing 10 (FIGS. 1 and 3). Cover 40 comprises two spaced lugs 41 extended from one side, a hole 42 through each lug 41, and a shaft 43 inserted through both holes 42 and having a U-shaped member 431 at one end near one hole 42 so that shaft 43 is free to rotate about holes 42.

In an assembly of the invention as illustrated in FIGS. 2 and 3, first hinged member 30 is rotated to an open state. Next, shaft 43 of cover 40 is passed through bottom of elastic hook 32 of hinged member 30 with U-shaped member 431 inserted in first trough 13 of upper housing 10 and second trough 24 of lower housing 20. Shaft 43 is thus prevented from rotating as U-shaped member 431 is positioned in first trough 13 and second trough 24. Next, elastic hook 32 is snapped into slot 22 of lower housing 20 for finishing the installation of hinged member 30. Also, shaft 43 is secured in slit 231 of lower housing 20 by hinged member 30. As a result, cover 40 is permitted to pivot about slit 231 in opening cover 40.

Figure 4:
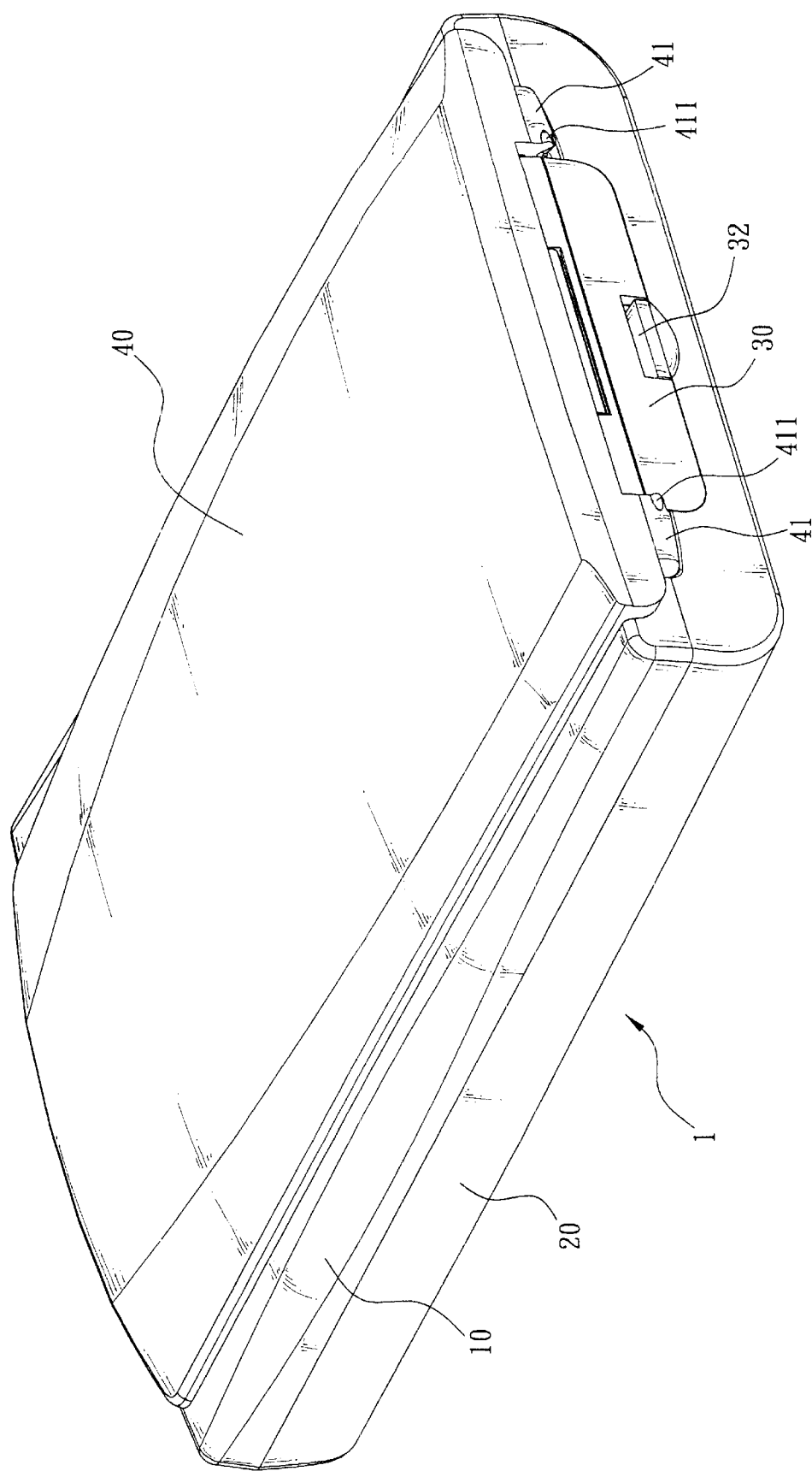
FIG. 4 is a perspective view showing cover is closed onto the electronic device of FIG. 1.
Figure 5:
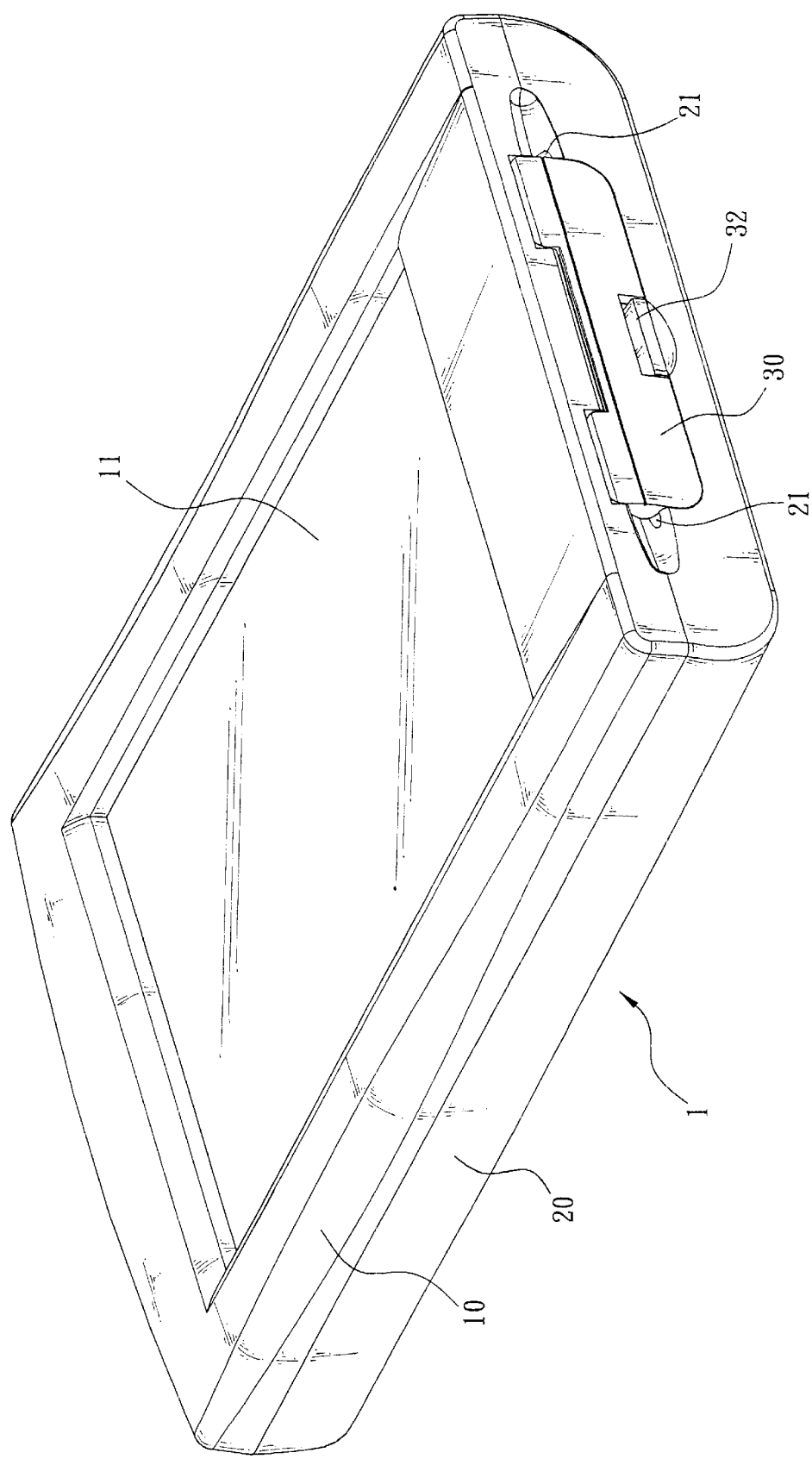
FIG. 5 is a view similar to FIG. 4 where cover is removed.

Referring to FIGS. 4 and 5, operations of opening and closing cover 40 will now be described. In an unused state (FIG. 4), cover 40 is closed onto display 11 for protection. When cover 40 is required to stay in a closed state, simply pull hinged member 30 to disengage elastic hook 32 from slot 22. Thus, it is easy to remove cover 40 from electronic device 1 (FIG. 5). Next, snap hinged member 30 to the original closed position. This does not change the electronic device's 1 appearance.

Figure 6:
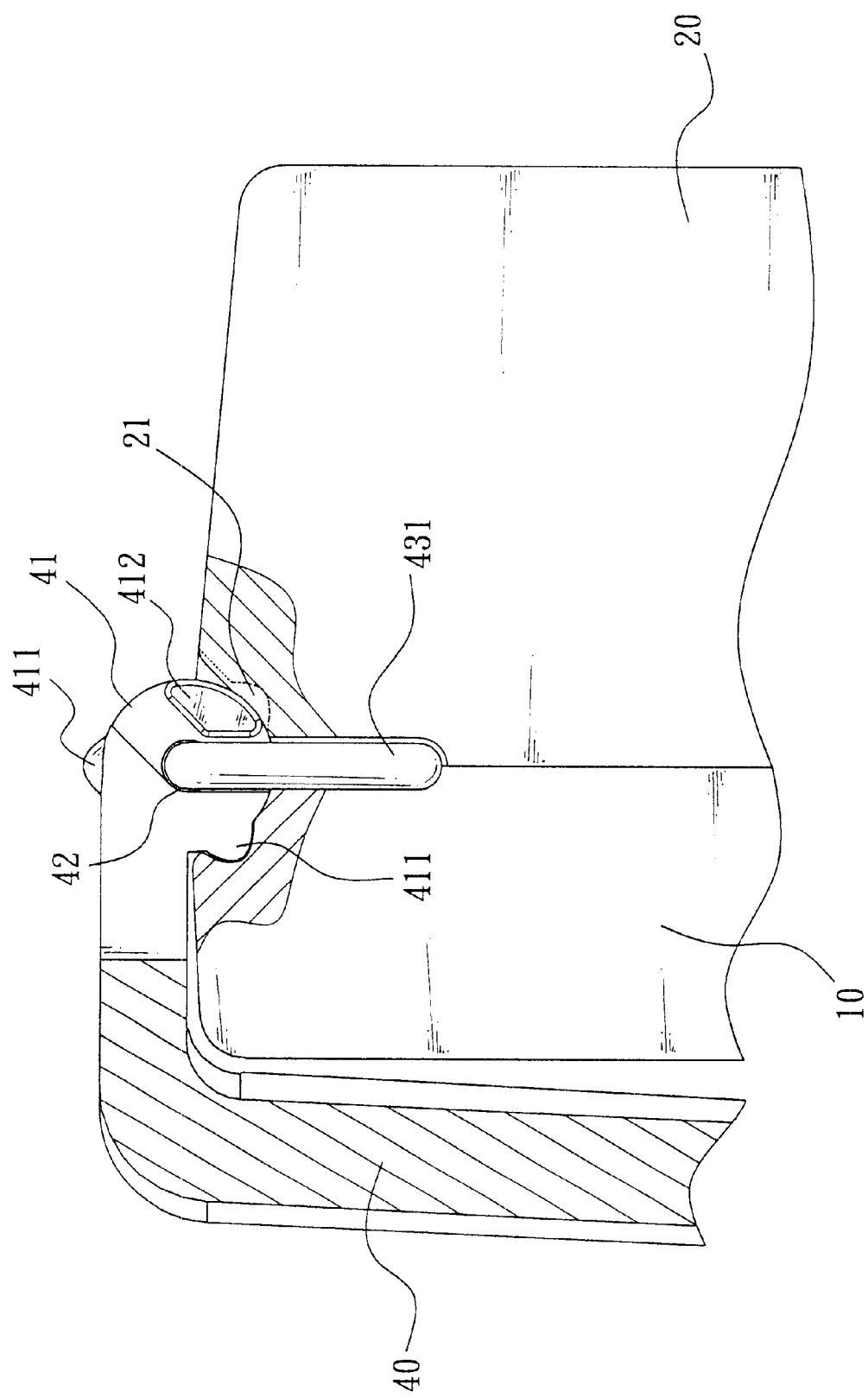
FIG. 6 is a schematic drawing showing protuberances in an open state of cover.
Figure 7:
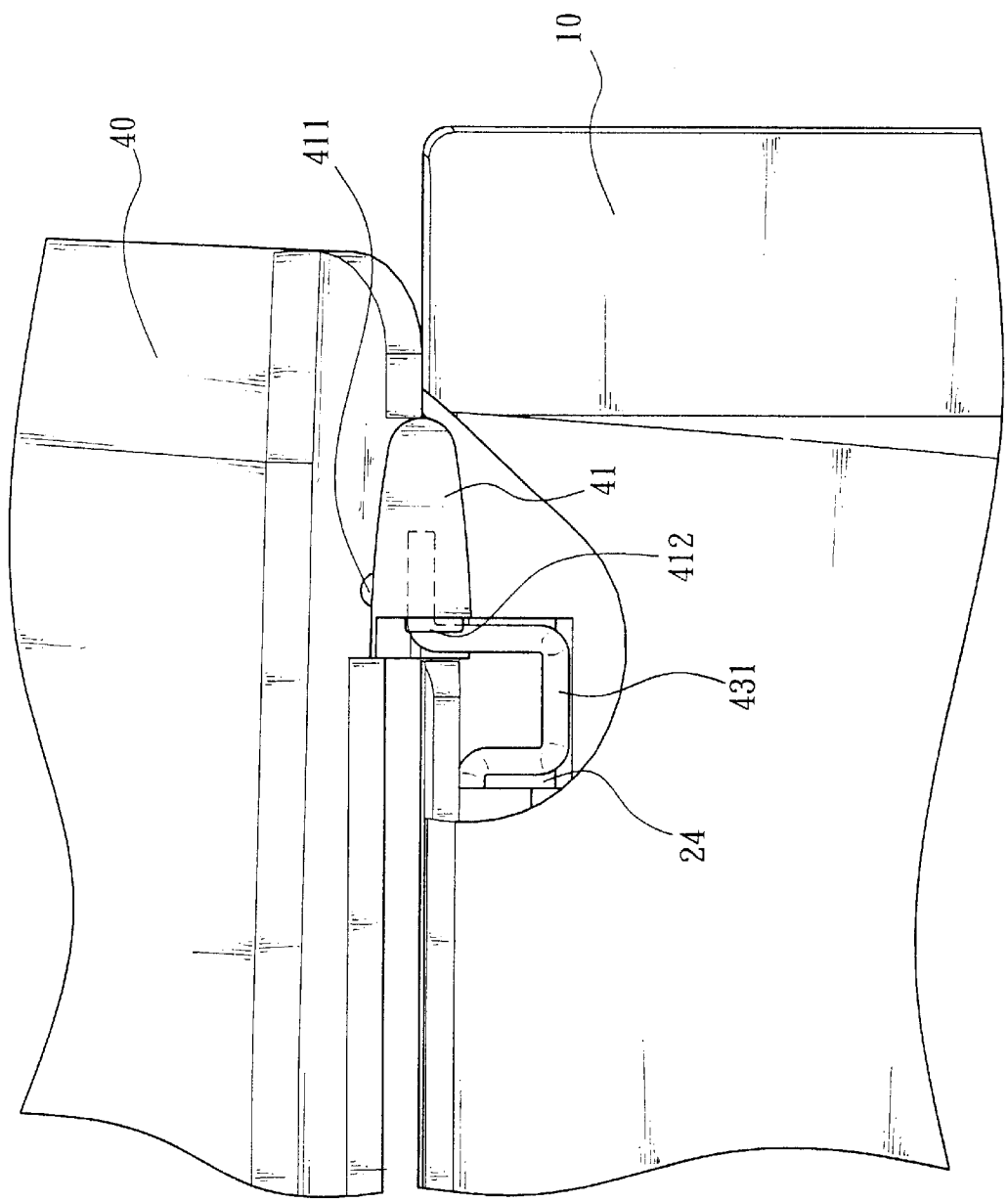
FIG. 7 is a view similar to FIG. 6 showing protuberances in a closed state of cover.

Referring to FIGS. 6 and 7, in the invention cover 40 may be positioned in one of a plurality of angles with respect to electronic device 1 in an open state as detailed below. For achieving such purpose, at least one protuberance 411 is provided on the surface of each lug 41. Also, at least one positioning member 412 is provided around hole 42 of each lug 41. Snapping members 21 of lower housing 20 are in an interference engagement with protuberances 411 and positioning members 412. Hence, cover 40 is permitted to position in one of a plurality of angles about electronic device 1 as opening. Further, user can open cover 40 to easily position in such desired angle with the designs of protuberances 411 and positioning members 412.

While the invention has been described by means of specific embodiments, numerous modifications and variations could be made thereto by those skilled in the art without departing from the scope and spirit of the invention set forth in the claims.

What is claimed is:

1. An electronic device having a removable cover comprising:

a housing including a display, a first recess on an edge, a groove on the first recess, and a slot on the first recess;

a hinged member including a lengthwise pin and an elastic hook associated with the pin, the pin being disposed in the groove and the hinged member being pivotal about the groove with the elastic hook snapped into the slot while closing onto the housing; and a cover disposed on the display and including two spaced lugs extended from one side, a hole through each lug, and a shaft inserted through the holes so that the shaft is rotatable about the holes;

wherein when the hinged member is rotated to an open state the shaft of the cover is passed through a bottom of the elastic hook of the hinged member, the shaft is positioned in the first recess, and the elastic hook of the hinged member is snapped into the slot for securing the shaft so that the cover is capable of pivoting about the electronic device or removing from the electronic device.

2. The electronic device of claim 1, wherein the housing is comprised of an upper housing and a mated lower housing and the groove is on the upper housing, further comprising a first trough on a side of the groove, a second recess on the lower housing corresponding to the first recess, and a snapping member on either end of the second recess wherein the slot is extended between the snapping members, further comprising a plate member in the slot corresponding to the groove and abuts on the pin for preventing the pin from moving out of the groove, a parallel slit is disposed between the plate member and the slot, and a second trough is in one end of the plate member corresponding to the first trough.

3. The electronic device of claim 1, wherein the electronic device is a personal digital assistant (PDA).

4. The electronic device of claim 1, wherein the electronic device is a cellular phone.

5. The electronic device of claim 2, wherein the shaft has a U-shaped member at one end near one of the holes and when the shaft is positioned in the housing, the U-shaped member is inserted in the first trough of the upper housing and the second trough of the lower housing for preventing the shaft from rotating and the shaft is secured in the parallel slit of the lower housing.

6. The electronic device of claim 2, wherein each lug includes at least one protuberance on a surface so that the snapping members of the lower housing are in an interference engagement with the protuberances for permitting the cover to position in one of a plurality of angles about the electronic device as opening and for permitting a user to easily position the cover in the angle.

7. The electronic device of claim 2, wherein the hole of each lug includes at least one positioning member therearound so that the snapping members of the lower housing are in an interference engagement with the positioning members for permitting the cover to position in one of a plurality of angles about the electronic device as opening and for permitting a user to easily position the cover in the angle.

* * * * *